(12) United States Patent
Pothapragada et al.

(10) Patent No.: US 6,442,682 B1
(45) Date of Patent: Aug. 27, 2002

(54) CHARACTERIZATION OF DATA ACCESS USING FILE SYSTEM

(75) Inventors: Srinivas Pothapragada, San Jose, CA (US); Lakshman Narayanaswamy; Bhimsen Bhanjois, both of Santa Clara, CA (US); Amod Bodas, Richmond Hill (CA); John S. Coviello, San Jose, CA (US)

(73) Assignee: Auspex Systems, Inc., Santa Clara, CA (US)

( * ) Notice: Subject to any disclaimer, the term of this patent is extended or adjusted under 35 U.S.C. 154(b) by 0 days.

(21) Appl. No.: 09/251,753

(22) Filed: Feb. 18, 1999

(51) Int. Cl.[7] .................................................. G06F 9/06
(52) U.S. Cl. .............................. 713/1; 713/100; 713/2; 710/10; 710/104; 709/220
(58) Field of Search ........................ 707/1, 200; 713/1, 713/2, 100; 710/10, 104; 709/220, 200, 221, 222

(56) References Cited

U.S. PATENT DOCUMENTS

| | | | | |
|---|---|---|---|---|
| 4,433,374 A | * | 2/1984 | Hanson et al. | 711/138 |
| 4,736,318 A | * | 4/1988 | Delyani et al. | 709/103 |
| 4,979,106 A | * | 12/1990 | Schneider | 713/1 |
| 5,355,453 A | * | 10/1994 | Row et al. | 709/219 |
| 5,367,637 A | * | 11/1994 | Wei | 710/56 |
| 5,497,492 A | * | 3/1996 | Zbikowski et al. | 713/2 |
| 5,504,904 A | * | 4/1996 | Dayan et al. | 713/1 |
| 5,574,915 A | * | 11/1996 | Lemon et al. | 712/220 |
| 5,634,058 A | * | 5/1997 | Allen et al. | 717/11 |
| 5,715,424 A | * | 2/1998 | Jesionowski et al. | 714/24 |
| 5,745,792 A | * | 4/1998 | Jost | 710/58 |
| 6,041,407 A | * | 3/2000 | Claar et al. | 713/1 |
| 6,192,470 B1 | * | 2/2001 | Kelley et al. | 713/1 |

FOREIGN PATENT DOCUMENTS

| WO | WO0049537 | * | 8/2000 | G06F/17/30 |
|---|---|---|---|---|

* cited by examiner

Primary Examiner—John Breene
Assistant Examiner—Debbie M Le
(74) Attorney, Agent, or Firm—Fish & Richardson P.C.

(57) ABSTRACT

An apparatus and a method manage data stored on one or more data storage devices using an adaptive file system by characterizing the data on the data storage devices managed by the file system; and tuning the file system by selecting one or more options to configure a kernel during boot-up and an operating system during mount time.

21 Claims, 10 Drawing Sheets

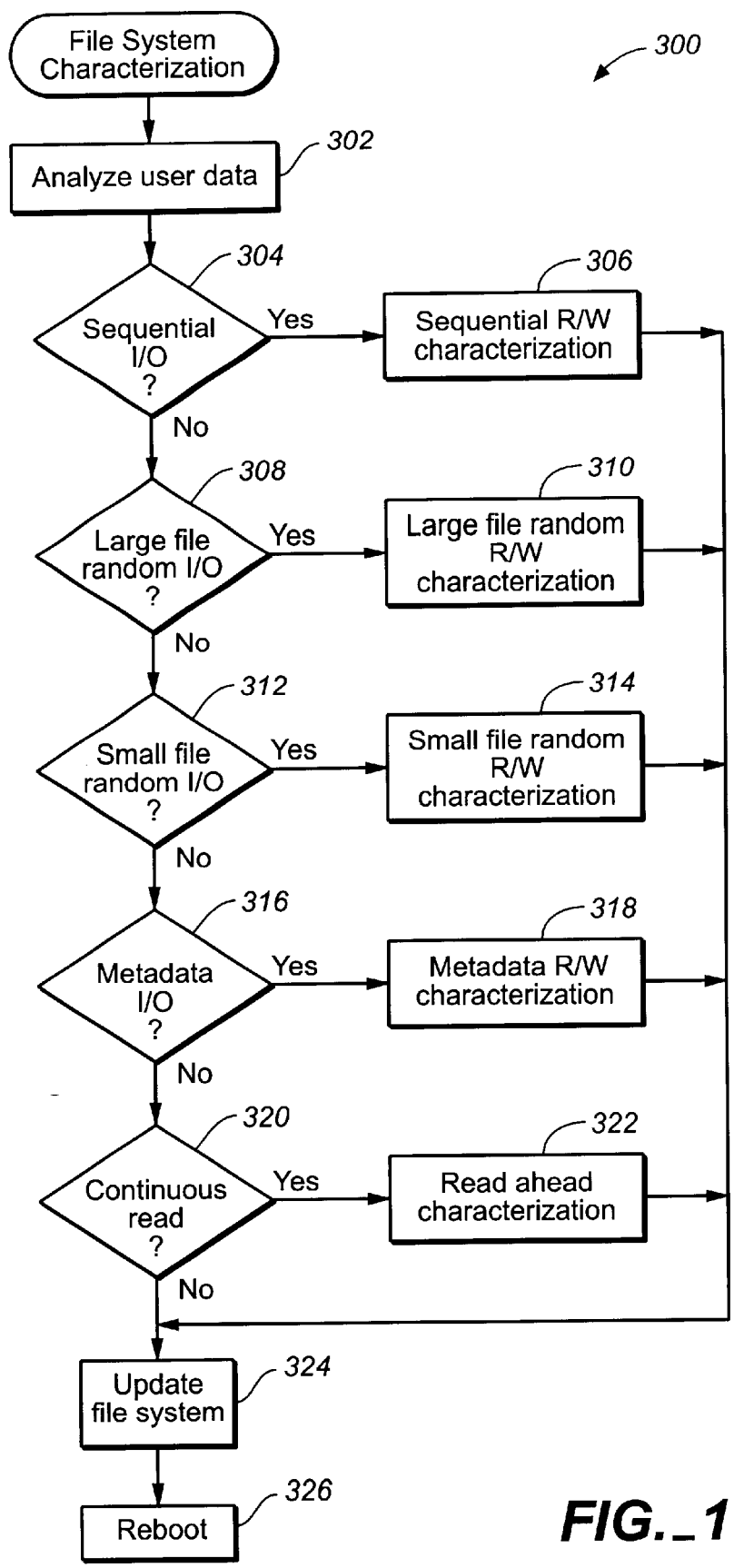
FIG._1

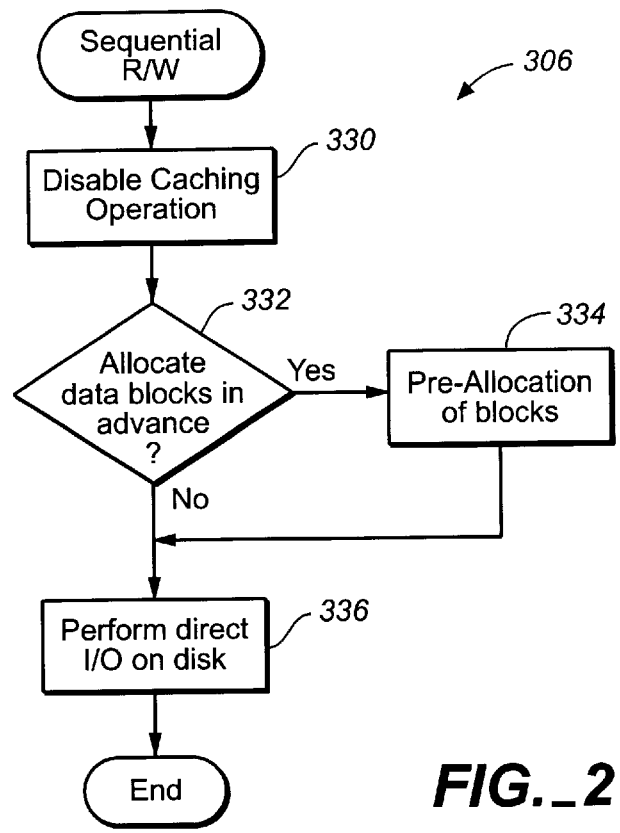
FIG._2
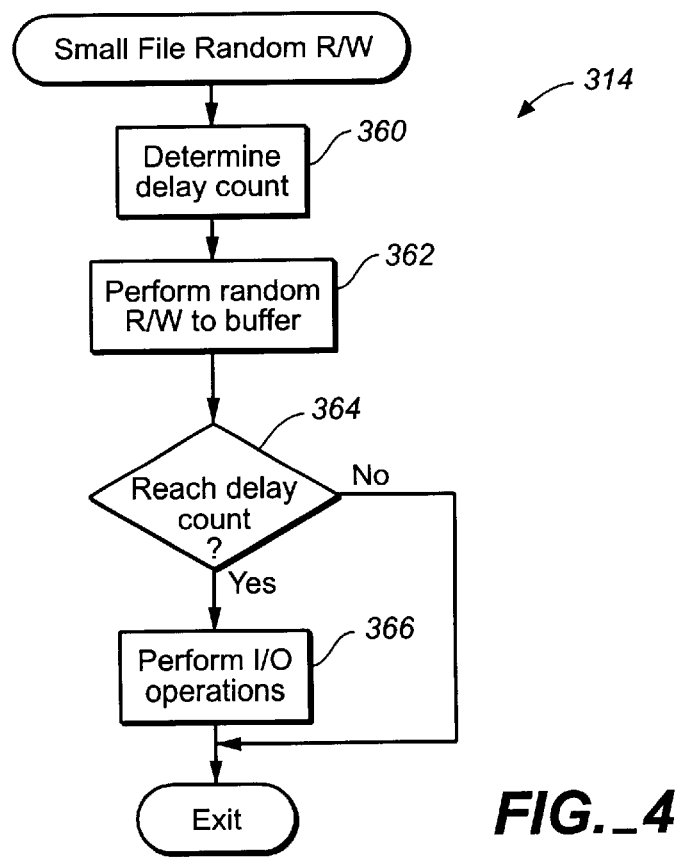
FIG._4

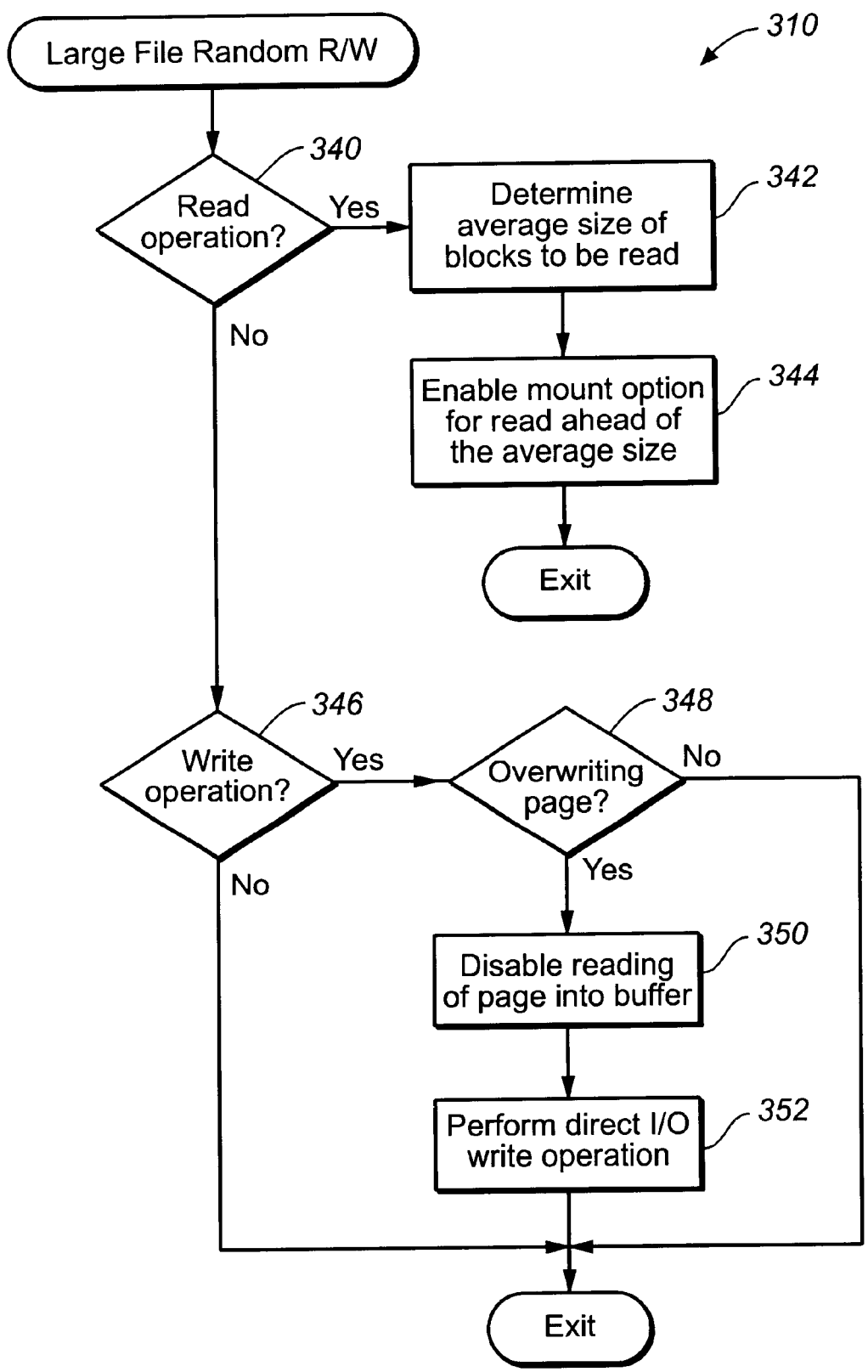
FIG._3

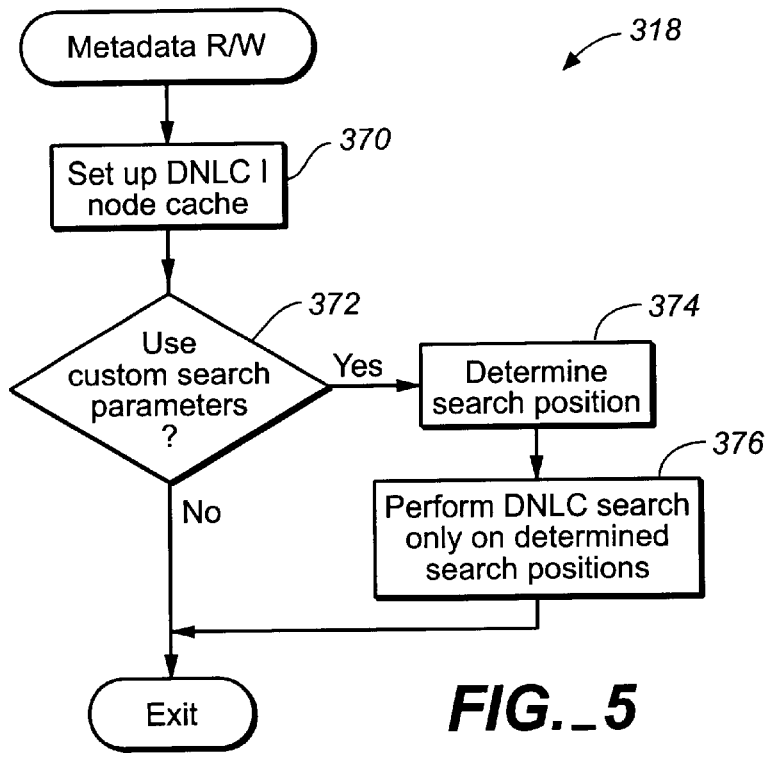
FIG._5
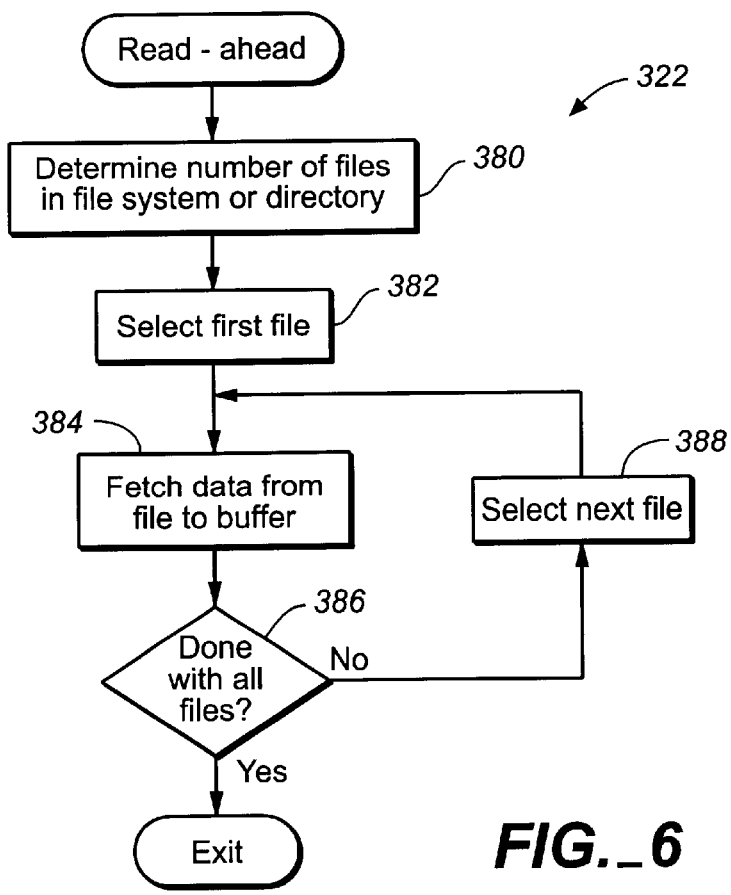
FIG._6

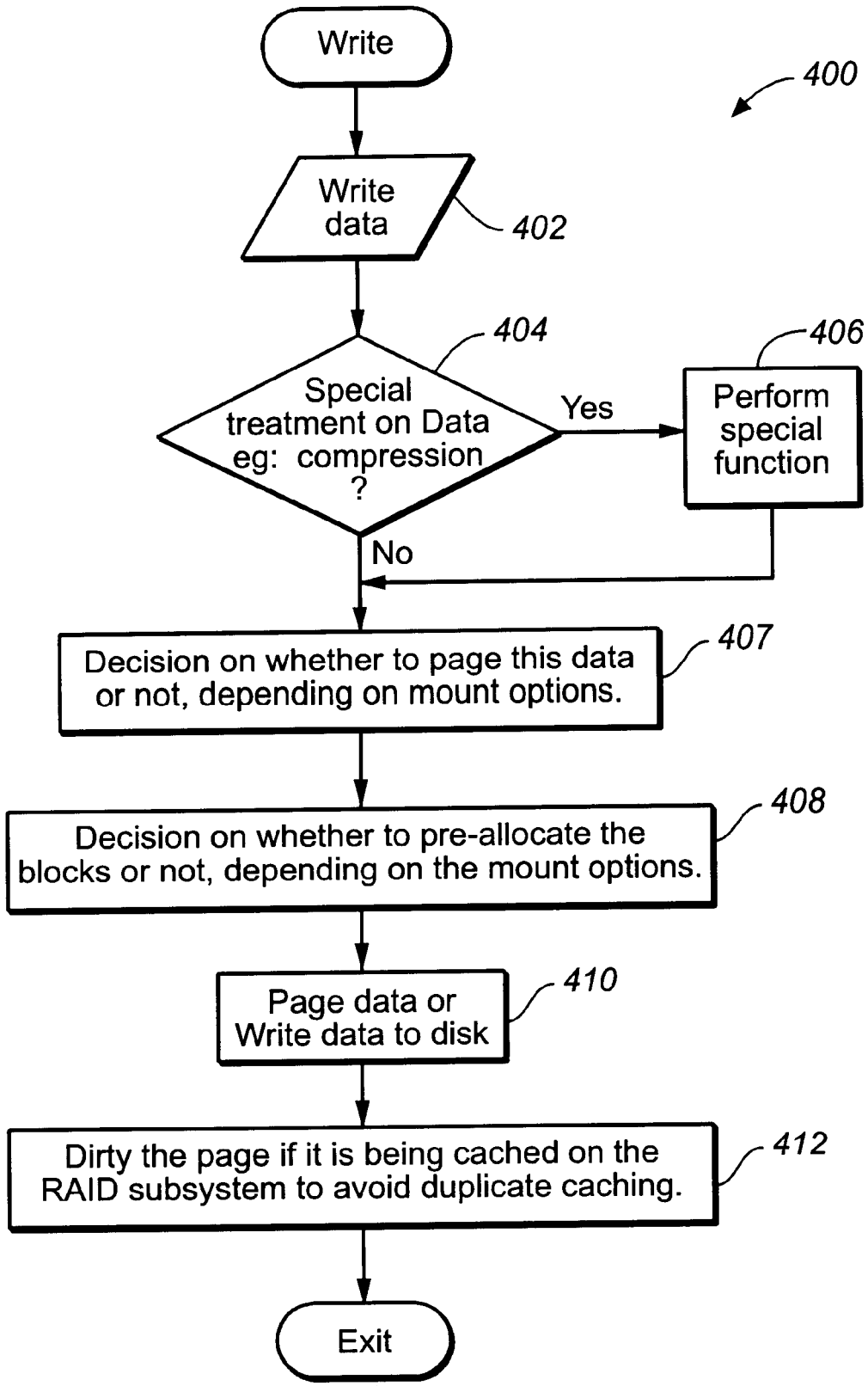
FIG._7

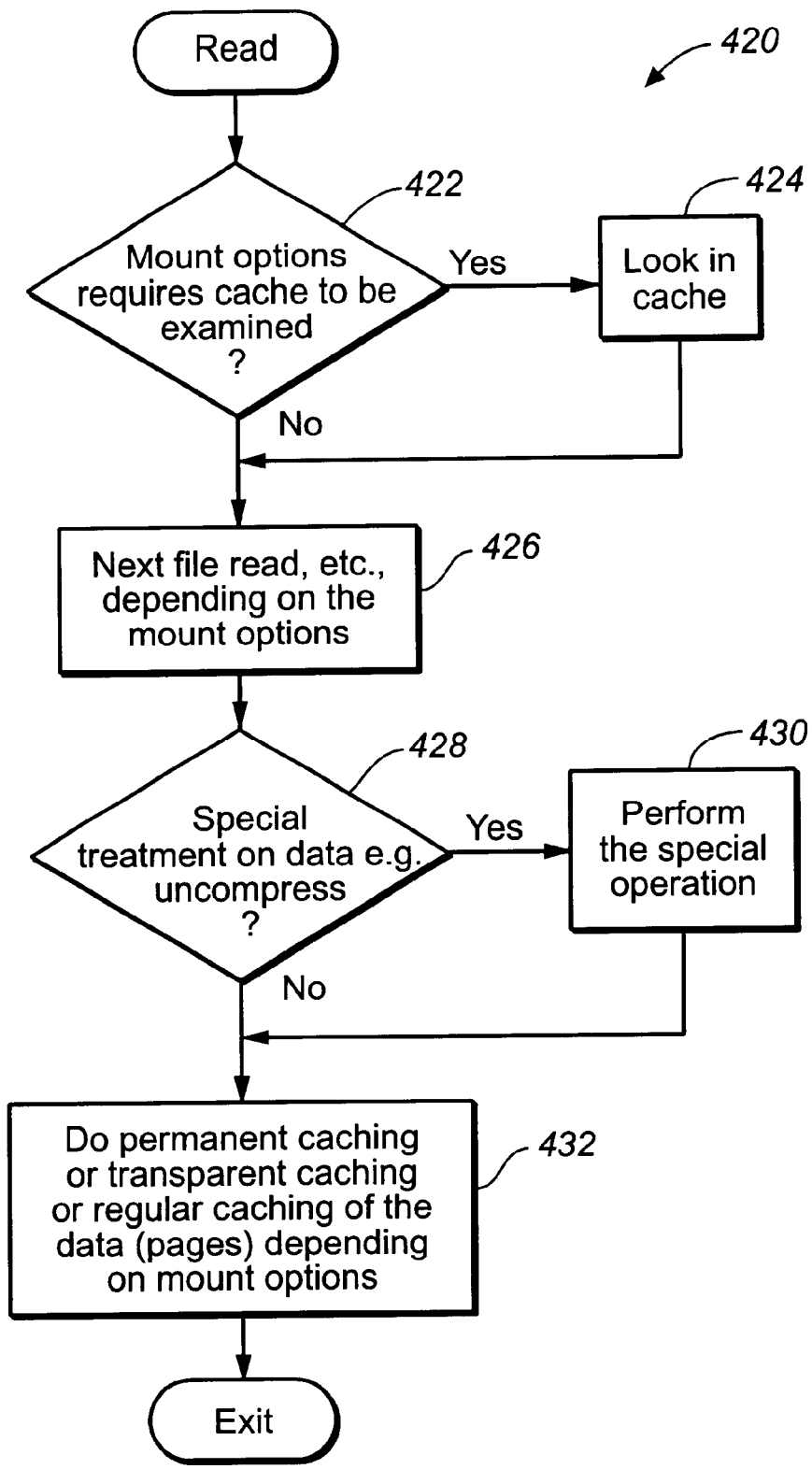
FIG._8

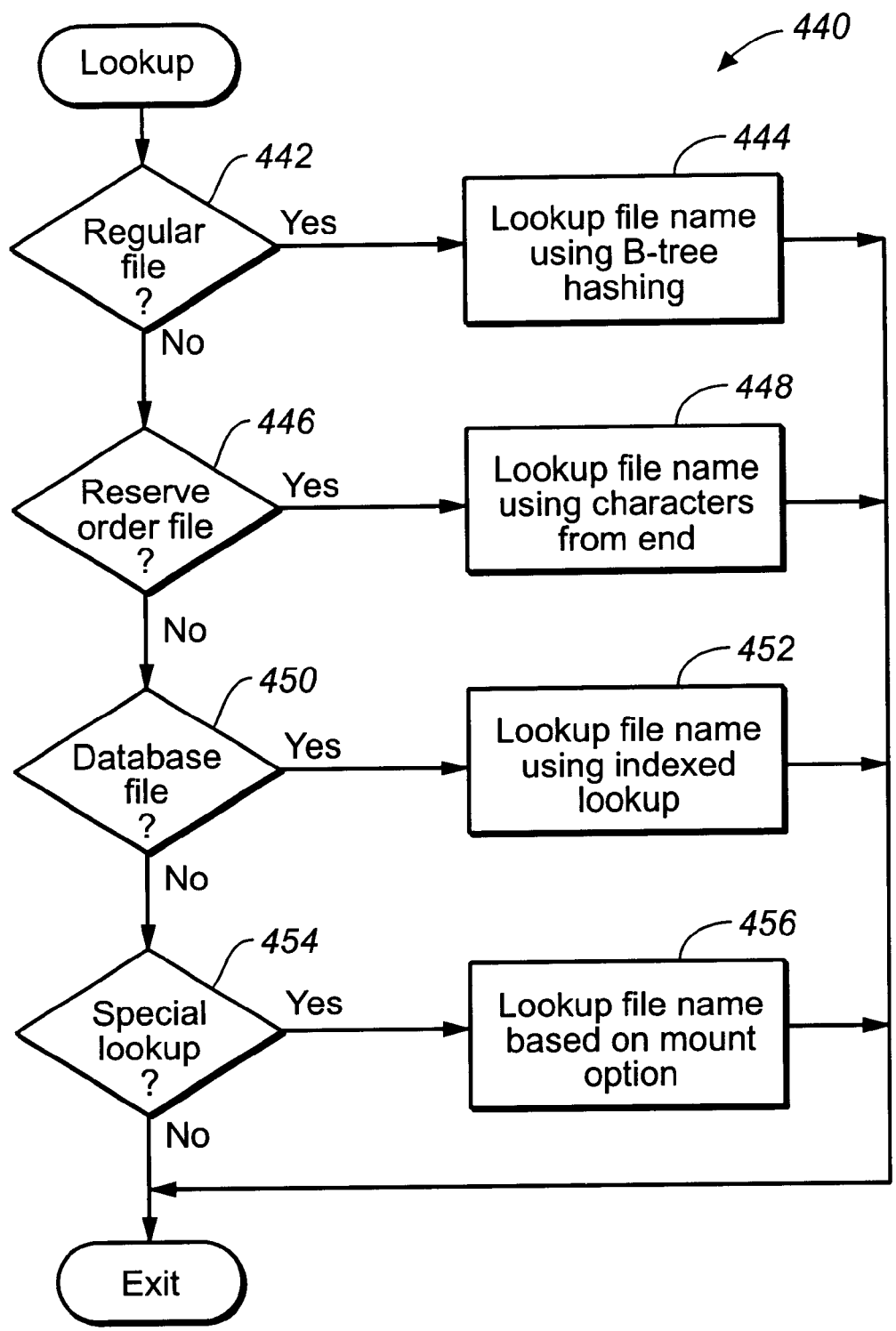
FIG._9

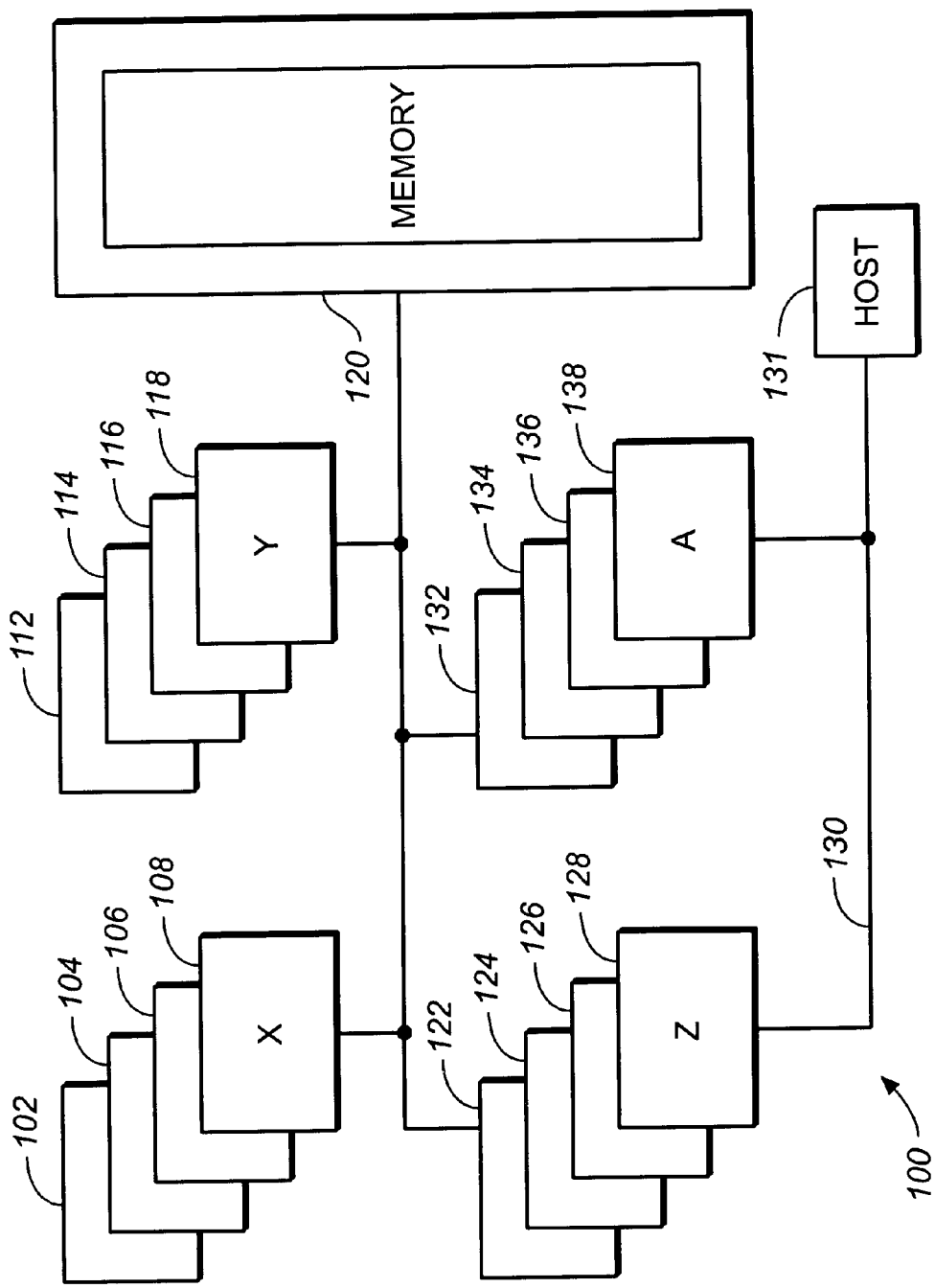
FIG._10A

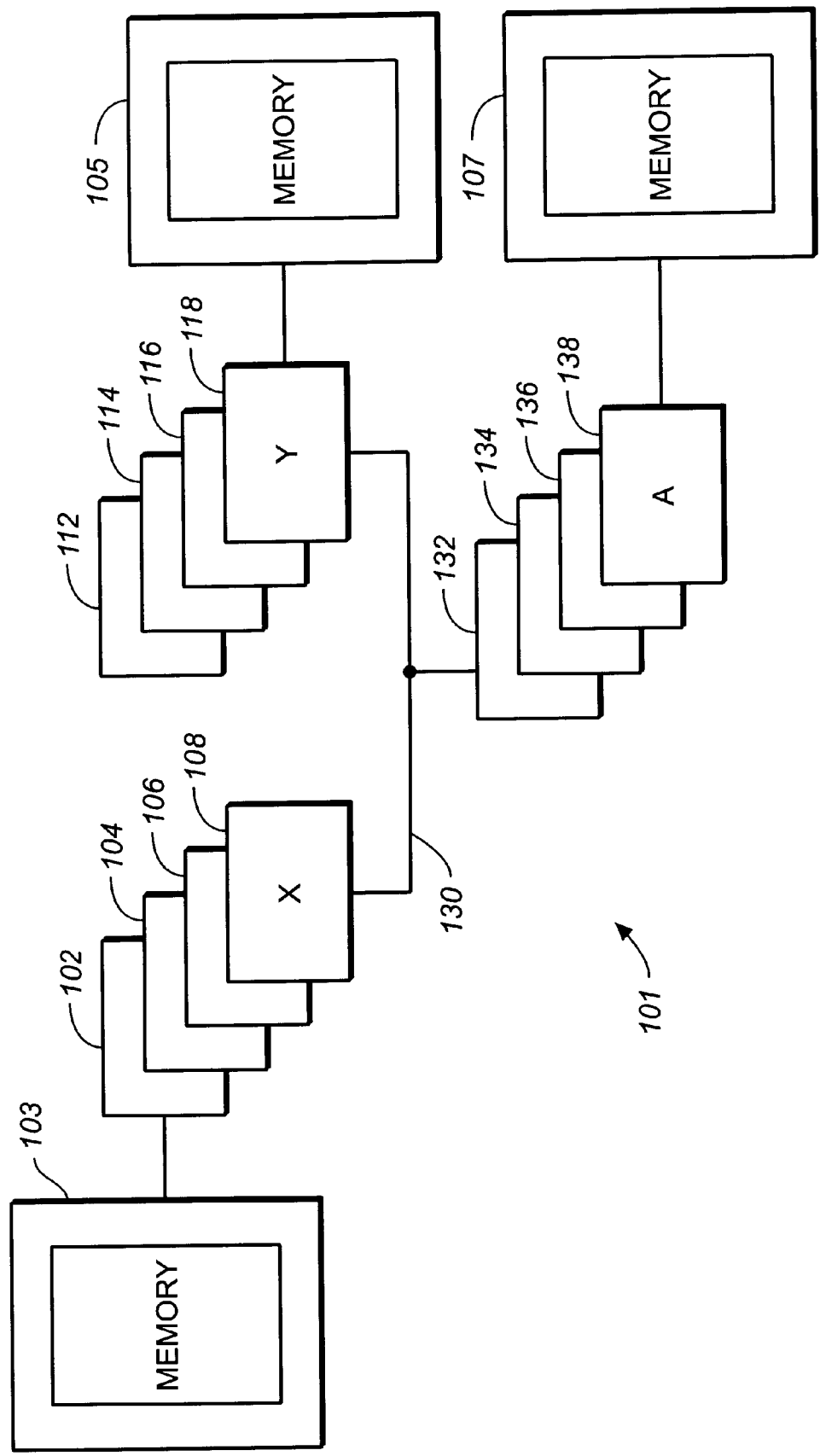
FIG._10B

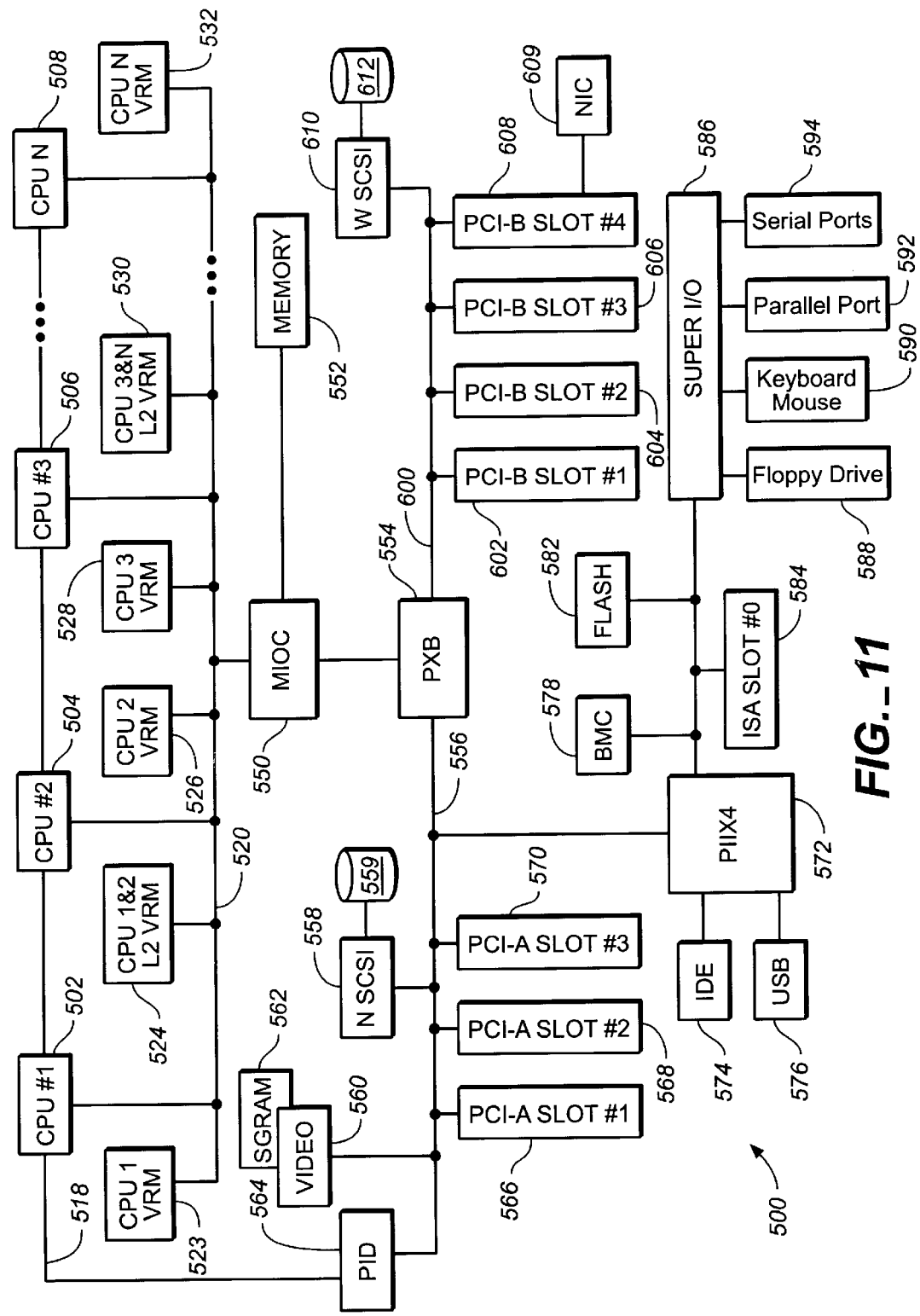
FIG._11

CHARACTERIZATION OF DATA ACCESS USING FILE SYSTEM

BACKGROUND OF THE INVENTION

The invention relates to a server with an adaptable and configurable file system.

The ever increasing capability of computers in storing and managing information has made them increasingly indispensable in modern businesses. The popularity of these machines has lead in turn to the widespread sharing and communication of data such as electronic mail and documents over one or more computer networks, including local area networks and wide area networks such as the Internet. To support the sharing of data, client-server architectures which support "enterprise" computing typically provide one or more servers which communicate with a number of personal computers, workstations, and other devices such as mass storage subsystems, network printers and interfaces to the public telephony system over the computer networks. The users perform processing in connection with data and programs that may be stored in the network mass storage subsystems through the network attached personal computers and workstations. In such an arrangement, the personal computers/workstations, operating as clients, download the data and programs from the network mass storage subsystems for processing and upload the resulting data to the network mass storage subsystems for storage.

In the server, a file system such as the Unix file system provides services for managing the space of storage media. They provide a logical framework to the users of a computer system for accessing data stored in the storage media. The logical framework usually includes a hierarchy of directory structures to locate a collection of files that contain user-named programs or data. The use of directories and files removes the concern from the users of finding the actual physical locations of the stored information in a storage medium. The logical framework may be stored as "metadata" or control information for the file such as file size and type and pointers to the actual data.

The file system dynamically constructs various data structures in the server's memory, as well as others that are stored with the file system itself on the storage device such as in the memory of attached personal computers and workstations. Typically, the required data structures are loaded from the disk storage device into memory buffer when the file is first accessed (mount time). These structures may be dynamically modified in the memory buffer. When the last access to a file system is made (unmount time), all related data structures remaining in memory buffer are flushed to the various data storage devices.

The access speed of data in the server depends not only from access methodology, but also from data flow in the server. Thus, the way data is physically written or read from disk, the layout of the file system, the size of the caches deployed, the way the pointers to the data blocks is stored, the flush rate of the caches, and the file system paging algorithm affect the efficiency of the server in servicing requests directed at it. If the performance of the server becomes unacceptable, the performance may be improved by changing one or more of the above server parameters. However, conventional systems which attempt to automatically optimize the server parameters do not have a global view of the application and thus may make local optimizations without any knowledge about the environment or the application.

One factor affecting the system performance is the size of the cache. With a limited cache memory, a multitude of requests over a variety of data segments can easily exhaust the capability of the disk cache system to retain the desirable data in the cache memory. Often, data that may be reused in the near future is flushed prematurely to make room in the cache memory for handling new requests, leading to an increase in the number of disk accesses to fill the cache. The increase in disk activity, also known as thrashing, institutes a self-defeating cycle in which feeding the cache with data previously flushed takes a disproportionate impact on the disk drive utilization. A related factor affecting the hit rate is the cache memory block size allocation. An allocation of a relatively large block of memory reduces the quantity of individually allocatable memory blocks. In systems having multiple concurrent tasks and processes that require access to a large number of data files, a reduction in the number of individually allocatable blocks increases the rate of cache block depletion, once more leading to thrashing which decreases the overall disk system throughput. Although additional memory can be added to the disk cache to alleviate the above-mentioned problems, an upper limit exists as to the size of the disk cache that is cost effective.

Another factor affecting the performance of the disk subsystem is the read-ahead policy for prefetching data associated with requests. Prefetching enhances performance when sequential data requests are encountered. However, in the event that the data access occurs in a random manner, the prefetching policy may be ineffective as data brought into the cache is not likely to be used again soon. Additionally, the prefetching policy may cause a bottleneck on the disk data path, as each attempt to prefetch unneeded data consumes valuable data transfer bandwidth in the server. Thus, an automatic prefetch of data in a system with a large percentage of random I/O operations may degrade the overall system performance.

During operation, the server must be capable of concurrently retrieving different data files for different clients, regardless of whether the files are large or small, or that they are actual or meta data, or that they are continuous or non-continuous data files. However, most applications requests data in patterns that are quite predictable. For example, in seismic, weather prediction, or multimedia applications, the data typically is voluminous and is typically not needed immediately afterward. Since the data typically used only once, caching this data often provides little benefit. In another application for serving Web pages, the characteristics of this application are: each Web page is infrequently updated, the data storage size of the Web page is typically small, and the number of accesses or hits for popular Web sites are typically high. During operation, conventional file systems typically bring pages associated with the accessed Web site into memory and serves the Web page(s) associated with the Web site. However, the memory containing the page(s) may be flushed relatively soon to make space for pages(s) associated with another Web site. On the next access of the original Web site, the pages need to be reloaded. In these cases, the automatic optimization may be suboptimal or unnecessary, leading to inefficiencies in such systems.

The access speed of data in servers with, Network Attached Storage (NAS) systems depends not only on the network access methodology, but also on the data flow within the server. Thus, the way the data is physically written or read from the disk, the layout of the file systems and the paging characteristic of the file system affect system performance. Many file systems like Unix File System (UFS), Write Anywhere File System (WAFL), Lazy Write File System (LWFS) may optimize performance using techniques such as pre-allocation of blocks in the case of sequential writes, delayed block allocation in the case of random access, and queuing of disk blocks within streams, among others. However, these systems make certain assumptions about the way the user data is characterized and classify data as sequential, random or meta-data and process data requests in accordance with the assumptions.

SUMMARY OF THE INVENTION

The present invention provides a file system which can be adapted to the characteristics of the access and storage methodology of the user's data. The user can tune the operation of the file system as well as get intelligent information from the file system on his data characteristics. The user is given options in the kernel (which needs system reboot) and options at the mount time to select the way his file system should behave while handling various data sets.

In one aspect, an apparatus and a method manage data stored on one or more data storage devices using an adaptive file system by characterizing the data on the data storage devices managed by the file system; and tuning the file system by selecting one or more options to configure a kernel during boot-up and an operating system during mount time.

Implementations of the invention include one or more of the following. One of the options may optimize the file system for sequential read/write operations by disabling caching of the data; and performing read/write operations directly to the data storage device. Blocks of data may be pre-allocated. One of the options may optimize the file system for large file random read operations by determining an average block size of the large file; and reading ahead blocks of data based on the determined average block size. One of the options may optimize the file system for large file random write operations by writing data directly to the data storage device. A page to be overwritten by the large file random write operation may be buffered. One of the options may optimize the file system for small file random read/write operations by performing a delayed read/write operation. Yet another option may optimize the file system for accessing metadata by generating a search parameter; and performing a search in accordance with the search parameter. The search parameter may compare either left-most or right-most characters of a file name. Another option may optimize the file system for sequential read operations by determining all files in a directory; and prefetching each file in the directory into a buffer.

In another aspect, a computer system includes an interconnect bus; one or more processors coupled to the interconnect bus and adapted to be configured for server specific functionalities including network processing, file processing, storage processing and application processing; a configuration processor coupled to the interconnect bus and to the processors, the configuration processor dynamically assigning processor functionalities upon request; one or more data storage devices coupled to the processors and managed by a file system; means for characterizing the data on the data storage devices managed by the file system; and means for tuning the file system by selecting one or more options in an operating system kernel and a mount table.

Advantages of the system includes the following. The server can be tuned for specific applications. The tuning process is simple, and only requires the user to select from a list of options as to the characterization of the processing load. Alternatively, the data may be characterized by automatically gathering and analyzing application data. The data in the file system can be sorted or retrieving depending on the characteristics of the data to get high performance without any overhead.

The file system can be configured from a host processor, which provides a single point of administration for system utilities and tools, including monitoring and tuning software. Since these activities are independent of file input/output operations, network file system (NFS) requests are serviced simultaneously with no performance degradation. This allows systems administrators to complete system management functions such as file backup and restore when convenient during normal system operation instead of during off hours.

The resulting server is powerful, scalable and reliable enough to allow users to consolidate their data for different applications onto one high performance system instead of scores of smaller, less reliable systems. This consolidation of data resources onto a powerful server brings a number of advantages to the client-server environment. The consolidation of data reduces the need to replicate data and to manage the consistency of the replicated data. Data is available more quickly and reliably than a conventional client-server architecture.

Other features and advantages will be apparent from the following description and the claims.

BRIEF DESCRIPTION OF THE DRAWINGS

The invention will be described with respect to particular embodiment thereof, and reference will be made to the drawings, in which:

FIG. 1 is a flowchart illustrating a process for characterizing a file system.

FIG. 2 is a flowchart illustrating a sequential read/write characterization process.

FIG. 3 is a flowchart illustrating a process for characterizing large file random read/write operations.

FIG. 4 is a flowchart illustrating a process for characterizing random read/write operations for small files.

FIG. 5 is a flowchart illustrating a process for characterizing meta data read/write operations.

FIG. 6 is a flowchart of a process for characterizing read ahead operations.

FIG. 7 is a flowchart illustrating a process for writing data using the file system of the present invention.

FIG. 8 is a flowchart illustrating a read operation using the file system of the present invention.

FIG. 9 is a flowchart illustrating a process for looking up file names.

FIG. 10A is a block diagram of a first computer system which loosely couples a plurality of tightly-coupled processors.

FIG. 10B is a block diagram of a second computer system which loosely couples a plurality of tightly-coupled processors.

FIG. 11 is a block diagram of an n-way processor computer system.

DESCRIPTION

FIG. 1 shows a process 300 for characterizing and configuring a file system of a computer. First, user data is sampled and analyzed (step 302). The analysis of user data may be performed directly by the user or may be automated.

After user data has been characterized in step 302, the process 300 then checks whether predominantly sequential input/output operations are performed on the user data (304). If so, a sequential redirect characterization is performed (step 306), which is illustrated in more detail in FIG. 2. From step 304, in the event that the user data is not predominantly sequential input/output in nature, the process 300 checks whether the user input/output operations are predominantly related to large file random operations (step 308). If so, the process 300 sets up the computer system to be optimized for a large file random read/write operations (step 310). Step 310 is shown in more detail in FIG. 3.

From step 308, in the event that large file random operations are not typically performed on the user data, the process 300 determines whether the operations performed on the user data are predominantly small file random input/output operations (step 312). If so, the process 300 sets up the file system to be optimized for small file random read/write operations (step 314), which is illustrated in more detail in FIG. 4. From step 312, in the event that small file random IO operations are not typically performed, the process 300 further checks whether the data retrieved is primarily metadata input/output operations (step 316). If so, the process 300 configures the file system so that it is optimized from metadata read/write operations (step 318). Step 318 is illustrated in more detail in FIG. 5. From step 316, in the event that the user data is not predominantly metadata, the process 300 further checks whether the user data is retrieved in a continuous read operation (step 320). If so, the process 300 optimizes the file system by characterizing data as being read ahead data (step 322), as illustrated in more detail in FIG. 6. From step 306, 310, 314, 318, 320, or 322, the process 300 updates the file system with the determined optimization (step 324) and reboots (step 326).

Additionally, the characterization of the requests directed at the data storage device may be automatically performed using neural networks, for example. Neural networks are used for data processing purposes on the basis of a plurality of multiplexed input parameters to give the best possible response thereto without necessarily knowing the relation between the individual input parameters.

Neural networks typically use a multitude of decision-making cells or neurons as well as connections or synapses among them. The neural networks are trained through a learning procedure before they are deployed, and the training process adjusts various parameters for the neurons and the synapses. The parameters include a threshold value which determines whether the neuron concerned fires or applies an electric pulse (or a computer generated pulse) after having received corresponding pulses from other neurons. The fired pulses are transferred via one or more synapses to other neurons, and the strength or the amplitude of the individual pulses transferred is one of the adjustable control parameters in the network.

A number of known training approaches may be used. For example, the training may be iterative, which means that the pattern concerned and the subsequent intermediate result patterns are run through the neural network. Alternatively, the neural network may be adjusted on the basis of an external signal generated by the external system.

The data that the neural network is trained on may be hand-picked by the user, or may be automatically generated using a usage profiler which captures relevant statistics on the usage, such as the application making the request, the number of requests, the amount of data transferred per request, the cache hit rate, and the cache flush rate, among others.

Moreover, in place of neural networks, other automated decision-making constructs can be deployed, including fuzzy logic and statistical analyzers.

The system of FIG. 1 handles the following categories of request, among others:

a. Sequential Writes
b. Sequential Reads
c. Random Writes of large, files
d. Random Reads of large files
e. Random Writes of small files
f. Random Reads of small files
g. Meta-Data I/O of large directories
h. Continuous reads of all files in a file system or directory With respect to sequential read and write operations, many applications read and write large amounts of data from and to individual files which may be quite large. In this case, the server cache cannot hold the entire file, and the application will likely not read the data back again immediately. As such, caching the data is not likely to improve performance. Direct I/O to and from the disk is better and creates fewer overheads on the file system. Also, if the blocks for the data on the disk were allocated in advance, performance can be improved. As such, two mount options called "transparent paging" and "pre-allocation of blocks" are provided in the file system.

Turning now to random read and write operations of large files, in some applications, large blocks of data may be randomly accessed. The user however has knowledge of the average size of the blocks to be accessed each time. To handle this situation, the file system offers a mount option called "read ahead='n' blocks." In the case of writes, the user is overwriting the large blocks and it would be inefficient to read the disk pages, overwrite it and write it back to the data storage device. To handle this situation, a mount option "overwrite on modify" is provided in the file system.

For applications which generate random reads and writes to small files, system performance is reduced since disk I/O of small blocks is expensive in terms of time. Also, too many random access requests can force the disk paging algorithms (page-in and page-out) to operate inefficiently. In this case, a write forward strategy, along with a delayed block allocation strategy, improves performance. Hence, a mount option providing "delayed block allocation" and "delayed writes" for coalescing data are supported in the file system.

In certain applications such as web serving, the home pages are rarely changed but are frequently read. As such, caching the home pages permanently or for a long time helps the response time. Hence, a mount option called "cache forever" is provided in the file system.

With respect to meta-data I/O of large directories, in certain environments such as the software development environment, the file system handles mainly metadata. Since caching of the meta-data is effective in this situation, a mount option "mcache" provides a large DNLC, I-node cache along with the support for intention logs.

Moreover, in this situation, the file name search algorithms typically use the first 2 bytes of the file names while many ISPs store the user mails using the same first >N=bytes of the file name and only change the last four bytes. As such, the most efficient name search should begin at the last four bytes. However, since conventional DNLC search algorithms start at the beginning of the name string, these search algorithms will get thrashed. Hence, the file system provides the user an option to choose a custom DNLC search algorithm using a mount option called "dnlcs=".

Additionally, in applications such as backup or voice and video mails, a sequential read operation of all files in the directory or sequential read of meta-data (headers) is typically done. The application reads all files in a directory or in the file system one by one. In this situation, the file system reads ahead the next file in the directory or the file system to speed up the application when a mount option called "sequential file fetch" is invoked.

Each mount option will be discussed in more detail next.

FIG. 2 illustrates in more detail step 306 of FIG. 1. In FIG. 2, the process initially disables all caching operation (step 330). Next, the process checks whether data blocks are to be allocated in advance (step 332). If so, a preallocation of data blocks is performed (step 334). From step 332 or 334, the process of FIG. 2 then performs direct input/output operations on the data storage device (step 336) before exiting.

Referring now to FIG. 3, a process associated with step 310 of FIG. 1 is shown in more detail. In FIG. 3, the process initially determines whether read operations are to be performed (step 340). If so, the process determines an average size of data blocks to be read (step 342). Further, the process enables a mount option to perform read ahead based on the determined average size (step 344) before exiting.

If a read operation is not performed in step 340, the process determines whether one or more write operations is to be performed (step 346). If so, the process further determines whether page overwrite page operations will be performed (step 348). If so, the process disables the reading of the page into the buffer (in step 350) and performs direct input/output write operations instead (step 352). From step 346, 348 or 352, the process of FIG. 3 exits. Steps 346–352 implement a delayed block allocation strategy where data is buffered into memory and written to disk after a suitable delay period.

Referring now to FIG. 4, step 314 of FIG. 1 is shown in more detail. The process initially determines a delay count (step 360). The delay count may be user-settable, or may be computer generated. Next, the process directs random read/write operations to a buffer (step 362). The process then determines whether the delayed count has been reached (step 364). If so, the buffer is flushed to the data storage device using direct input/output operations (step 366). From step 364, in the event that the delay count is not reached, or from step 366, the process exits. By buffering the data in memory and writing the data after a delay count, the process of FIG. 4 also implements a delayed block allocation strategy.

FIG. 5 illustrates in more detail step 318 of FIG. 1. Initially, the process initializes a directory name lookup cache (DNLC) i-node cache (step 370). The DNLC cache is a metadata cache which contains file management information supporting both multiple file allocation and random access. The file management information can convert from a logical block number to a physical sector number by indexing into the array using the logical block number. In addition to logical to physical block mapping, the metadata cache includes information on the type and access mode for the file, the file's owner, the group access identifier, the number of references to the file, the time the file was last read and written, the time the metadata cache was last updated, the size of the file, and the number of physical blocks used by the file, among others. The directory name look up table is used to speed up directory searches, as Unix file system (UFS) directories are flat and are searched sequentially. Further, the directory name look up table maintains hits and misses for short file names. In the directory name look up the structures are kept in a least recently used (LRU) order and maintained as a hashed table.

Turning back to FIG. 5, the process determines whether a custom search parameter is to be used (step 372). If so, an appropriate search position is determined (step 374). The process then performs a DNLC search only under determined search positions (step 376). For example, in certain applications where the unique identification of each file can be determined by examining only the characters on the left side of the name string, then the custom search parameter would be set to indicate that the DNLC search is to examine N left-most characters, and vice versa. From step 372 or 376, the process of FIG. 5 exits.

Turning now to FIG. 6, step 322 of FIG. 1 is illustrated in more detail. In FIG. 6, the application characteristics requires that data be sequentially transferred. As such, read-ahead or prefetching is an optimal strategy and the process of FIG. 6 performs read-ahead on all files in a particular directory or the entire file system if needed. First, the process determines the number of files in the file system or in the directory (step 380). The first file is selected (step 382), and data is fetched from the file to the buffer (step 384). Next, the process checks whether all files have been retrieved (step 386). If not, the next file is selected (step 388) and the process loops back to step 384 to continue fetching data from the file to the buffer. In step 386, in the event that all files have been retrieved, the process of FIG. 6 exits.

Turning now to FIG. 7, a write process 400 is illustrated. The write process 400 initially buffers write data into memory (step 402). Next, the process 400 determines whether special treatment is to be performed on the write data (step 404). The special treatment function may include compression or encryption, among others. In the event that special treatment is to be performed, the process 400 performs a special function (step 406). From step 404 or 406, the process 400 decides whether to page the write data depending on the mount options (step 407). Additionally, the process 400 determines whether data is to be preallocated, depending on the mount options (step 408). Next, data is paged or written to the disk (step 410). Next, the process 400 "dirties" the page by marking a suitable status bit if the page is being cached on a redundant array of inexpensive disks (RAID) sub-system to avoid duplicate caching (step 412).

Turning now to FIG. 8, a process 420 for performing read operations is illustrated. First, the process 420 determines whether a cache is to be examined, based on one of the mount options (step 422). If so, the cache is examined and analyzed (step 424). From step 422 or 424, the process 420 performed read ahead operation, depending on the mount options (step 426).

Next, the process 420 determines whether a special treatment needs to be performed on the data (step 428). If so, the special function is performed (step 430). From step 428 or 430, the process performs a permanent caching or a transparent caching or a regular caching of the data pages, depending on the mount options (step 432) and exits.

Turning now to FIG. 9, a process 440 for performing file name lookup is shown. First, the process 440 determines whether the target file is a regular file (step 442), and if so, the process 440 looks up the file name based on binary tree hashing for regular file (step 444) before exiting.

Alternatively, the process 440 checks whether the file is a reserve order file (step 446). If so, the process 440 performs a special lookup for a temporary file (step 448). The reserve order lookup searches the file name by examining letters starting at the end rather at the beginning as is conventional. This is done to distinguish the files which commonly share the initial drives and subdirectory information. After performing the look-up, the process 440 exits.

From step 446, in the event that the file is not a reserve order file, the process 440 determines whether the file is a database file (step 450). If it is, the process 440 performs an index lookup for the database file (step 452). Alternatively, the process 440 determines whether the file requires a special or a custom look up (step 454). If so, the process 400 performs the special file lookup based on one or more specified mount options (step 456). In all of the above flowcharts for data flow, the file system can automatically adapt the data flow based on the characteristics of the incoming data or can be configured by the user.

The file system described above may run on a uni-processor or a multi-processor server. FIG. 10A shows a computer system 100 which loosely couples a plurality of tightly coupled processors in collectively providing a high performance server. The system 100 has a plurality of processors 102–108, 112–118, 122–128 and 132–138. Each of the processors 102–108, 112–118, 122–128 and 132–138 communicates over a high speed interconnect bus 130. A memory array 120 is also connected to the bus 130. Additionally, a host processor 131 communicates with processors 122–128 and 132–138 over the bus 130. The memory can be local to a set of multiprocessor nodes 102–108, 112–118, 122–128 and 132–138.

FIG. 10B shows a computer system 101 which loosely couples a plurality of tightly coupled processors, each with its own memory. As in FIG. 10A, the system 101 has a plurality of processors 102–108, 112–118 and 132–138 which communicate over the high speed interconnect bus 130. A memory subsystem 103 is locally connected to multiprocessor nodes 102–108, while memory subsystems 105 and 107 are locally connected to multiprocessor nodes 112–118 and 132–138, respectively.

In FIGS. 10A and 10B, the interconnect bus 130 may be a GTL+ bus, or may be a computer bus such as a PCI bus, a SCSI bus, or a Scalable Coherent Interface (SCI) bus which is a distributed interconnect bus on both GTL and SCI. The interconnect between nodes can be a local area network or a wide area network (LAN/WAN).

In one embodiment, the bus 130 is a 100 Mhz Slot 2 system bus which enables processors such as the Pentium II Xeon processors to be "multiprocessor ready." The bus 130 has a synchronous, latched bus protocol that allows a full clock cycle for signal transmission and a full clock cycle for signal interpretation and generation. This protocol simplifies interconnect timing requirements and supports 100 Mhz system designs using conventional interconnect technology. Low-voltage-swing AGTL+I/O buffers support high frequency signal communications between many loads. In this embodiment, the processor supports ECC on the data signals for all L2 cache bus and system bus transactions, automatically correcting single-bit errors and alerting the system to any double-bit errors such that mission-critical data is protected. The processor also supports full Functional Redundancy Checking (FRC) to increase the integrity of critical applications. Full FRC compares the outputs of multiple processors and checks for discrepancies. In an FRC pair, one processor acts as a master, the other as a checker. The checker signals the system if it detects any differences between the processors' outputs.

In a second embodiment using the SCI bus, the interconnect bus 130 may be deployed using a number of topologies, including a ring configuration where subsystems are connected as a ring which is not hot-pluggable. Alternatively, the interconnect bus 130 may be a multi-ported switch where each subsystem is on its own SCI ring and therefore can be hot plugged. Additional port switches can be used to allow the system to improve the bandwidth. The standard SCI interconnect uses five meter point-to-point cabling with two fifty-pin very high density Small Computer System Interface (SCSI) style connectors for both the input and output of the SCI interconnect 130.

Also attached to the interconnect bus 130 can be a host processor 131. The host processor 131 runs an operating system such as Windows-NT, available from Microsoft Corp. of Redmond, Wash., or Solaris UNIX operating system, available from Sun Microsystems of Mountain View, Calif. The host processor 131 provides a platform for network and system administration, backup and archive operations, database management, and other applications. Functions such as network information services (NIS) and network lock manager (NLM) can also be executed on the host processor 131.

The interconnect bus 130 supports booting of processors from the host processor 131 or a master control processor. Generally, an on-board Basic Input/Output System (BIOS) initializes the processors on the bus 130 and configures it to participate on the bus 130. From there, the presence of all processors is detected by the host or control processor 131, where a configuration utility takes over, as described in more detail below.

To further improve reliability, other components in the system of FIG. 10A, such as the processors 102–108, 112–118, 122–128 and 132–138, may monitor the status of the host or control processor 131 and determine when the host or control processor 131 is inoperative. If the host processor 131 is hung, the processors 102–108, 112–118, 122–128 and 132–138 can force the host or control processor 131 to reboot. In this event, the processors retain any state information the host or control processor 131 requires such as the state of the network interface cards while the host or control processor 131 boots. New status messages are saved and forwarded to the host or control processor 131 after the reboot is complete. New mount request and NIS queries are serviced as soon as the reboot is complete. In a similar manner, in the event that one of the processors 102–108, 112–118, 122–128 and 132–138 fails, the computer system 100 of FIG. 10A continues to operate without failing.

As shown in FIG. 10A, the server system 100 is a loosely coupling of processors which cooperate with each other in performing server related functions, for example network processing, file processing, storage processing, and application processing. Due to the loosely coupled nature of the multiprocessor nodes, processors 102–108, for example, can reboot on their own due to a failure and still come back to serve their designated functionalities. The heterogeneous coupling of the processors 102–108, 112–118, 122–128 and 132–138 provide a user with the flexibility to grow the processing power of the server system 100 as required for a specific application. For instance, certain applications require more processing power for network processing and thus more processors should be dedicated toward network processing. Other applications may require more processing power for file and storage processing and more processors should be dedicated toward these tasks.

The hybrid multi-processing or heterogeneous coupling of processors of FIGS. 10A and 10B allows the user to robustly grow the processing power of the server systems 100 and 101. Each processor in the n-way processors can be a:

1. Network processor;
2. File Processor;
3. Storage Processor;
4. Network and File Processor;
5. Network and Storage Processor (SAS);

6. Storage and File Processor;
7. Network, Storage and File Processor (NAS); or
8. Application Processor.

Each configured network processor has a read cache for buffering previous requests for data from clients. Each network processor also has a mount table for routing data request messages to their appropriate destinations. Thus, with the mount table, the network processor can directly forward a request to an appropriate file processor(s), based on pre-determined criteria.

Each configured file processor has a metadata cache which contains file management information, including a directory name look-up table, among others. The directory name look-up table is used to speed up directory look-ups, as Unix file system (UFS) directories are flat and much be searched sequentially. Further, the directory name look-up table maintains hits and misses for short file names. In the directory name look-up, the structures are kept in a least recently used (LRU) order and maintained as a hashed table.

When configured as a storage processor (SP), each processor has a write cache which buffers write requests to the respective disk drives to increase I/O data transfer performance and decrease acknowledgment latencies. Due to the architecture, the network processors can individually access any of the file processors. Furthermore, each of the file processors can go through a storage processor and a disk to retrieve information requested by the client.

The network processors provide all protocol processing between the network layer data format and an internal file server format for communicating client requests to other processors in the system. Only those data packets which cannot be interpreted by the network processors, for example client requests to run a client-defined program on the server, are transmitted to the host or control processor 131 for processing. Thus the network processors, file processors and storage processors contain only small parts of an overall operating system, and each is optimized for the particular type of work to which it is dedicated.

Although the FPs are shown apart from the SPs, the FPs can be combined pairwise with their respective SPs. For instance, the combination of one FP and one SP creates a file storage processor (FSP).

The application processor can run any of the shelf operating system. This processor can also run specific applications. For example, the application processor can run dynamic loading of web pages or process voice and video mail management or can run Solaris or NT and can handle generic applications.

The architectures of FIGS. 10A and 10B are advantageous in that the host or control processor 131 provides a single point of administration for system utilities and tools, including monitoring, updating, backing-up and tuning software. The architecture further takes advantage of processors which are dedicated and optimized for specific tasks. As function-specific caches are provided with each processor, throughput is further increased. Additionally, the dedicated processors can transfer data with relatively low communication overheads. The resulting system is powerful, scalable and reliable enough to allow users to consolidate their data onto one high performance system that can provide data more quickly and reliably than a conventional client/server architecture.

FIG. 11 shows a block diagram of a computer system 500. The computer system 500 has a plurality of processors 502–508. Each of processors 502–508 has an associated voltage regulation module (VRM) 523, 526, 528 and 532, respectively. Additionally, processors 502 and 504 have Level 2 (L2) caches which are supported by an L2 VRM 524. Similarly, processors 506 and 508 have L2 caches which are supported by an L2 VRM 530. Moreover, processors 502–508 communicate over a high speed host bus 520. In an embodiment, the host bus 520 is a GTL+ bus operating at 100 MHZ. Also connected to the host bus 520 is a memory input output controller 550. The memory input output controller 550 controls a memory array 552 over a high speed bus which may also be a GTL+ bus.

The memory input output control of 550 is also connected to a PCI expansion bridge (PXB) 554. The PXB 554 drives a first PCI bus (PCI-A) bus 556. Connected to the PCI-A bus 556 are a video controller 560 and a video memory 562. The video memory 562 may be a synchronous graphics random access memory (SGRAM).

Also connected to the PCI-A bus 556 is a programmable interrupt device (PID) 564. The PID 564 controls an advanced processor interrupt controller (APIC) bus 518. The bus 518 communicates with each of CPUs 502–508. Interrupts are managed and broadcasted to local APICs in each of processors 502–508. The PID 564 monitors each interrupt on each PCI device, including PCI slots 566–570 in addition to compatible interrupts IRQ0-IRQ15, and on occurrence of an interrupt, sends a message corresponding to the interrupt across a three wire serial interface to the local APICs. The APIC bus 518 minimizes interrupt latency for compatibility between the interrupt sources. The PID 564 can also supply more than 16 interrupt levels to processors 502–508. The APIC bus 518 has an APIC clock and two bidirectional data lines. The interrupts can be disabled and all processor nodes can poll each I/O device for its status. For example, each processor node can poll a status bit of a receive/transmit buffer on the NIC to determine whether a packet has been received or transmitted.

The PCI-A bus 556 is also connected to a narrow small computer system interface (SCSI) interface 558. The SCSI interface 558 in turn controls one or more data storage devices 559. The narrow SCSI host adaptor may be a Symbios SYM53C810AE, which contains a high performance SCSI core capable of fast 8-byte SCSI transfers in single-ended mode.

Also connected to the PCI-A bus 556 is a bridge to an ISA input output subsystem (PIIX4) 572. The PIIX4 provides an IDE floppy controller 574, a universal serial bus (USB) controller 576, a baseboard management controller (BMC) 578, a flash memory 582 for BIOS ROM and extension storage, and an ISA slot 584. The PIIX4 572 also communicates with a Super Input/Output device 586 which drives a floppy drive 588, a keyboard/mouse port 590, a parallel port 592 and one or more serial ports 594.

The PXB 554 also provides a second PCI bus (PCI-B) 600. The PCI-B bus 600 has a plurality of PCI-B slots 602–608 with PCI-B slot 608 connected to NIC 609. Also, PCI-B bus 600 is connected to a wide SCSI controller 610. The wide SCSI controller 610 may be a Symbios SYM53C896 dual channel LVD/SE (Ultra 2/Ultra) SCSI controller. The wide SCSI controller 610 in turn drives one or more data storage devices 612.

The above described software can be implemented in a high level procedural or object-oriented programming language to operate on a dedicated or embedded system. However, the programs can be implemented in assembly or machine language, if desired. In any case, the language may be a compiled or interpreted language.

Each such computer program can be stored on a storage medium or device (e.g., CD-ROM, hard disk or magnetic diskette) that is readable by a general or special purpose programmable computer for configuring and operating the computer when the storage medium or device is read by the computer to perform the procedures described. The system also may be implemented as a computer-readable storage medium, configured with a computer program, where the storage medium so configured causes a computer to operate in a specific and predefined manner.

While the invention has been shown and described with reference to an embodiment thereof, those skilled in the art will understand that the above and other changes in form and detail may be made without departing from the spirit and scope of the following claims.

Other embodiments are within the scope of the following claims.

What is claimed is:

1. An adaptive file system for managing data stored on one or more data storage devices, comprising:
   means for characterizing the data on the data storage devices managed by the file system; and
   means for tuning the file system, according to the data characterization, by selecting one or more options to configure a kernel during boot-up and an operating system during mount time.

2. The adaptive file system of claim 1, wherein one of the options optimizes the file system for sequential read/write operations, further comprising:
   means for disabling caching of the data; and
   means for performing read/write operations directly to the data storage device.

3. The adaptive file system of claim 2, further comprising means for pre-allocating blocks of data.

4. The adaptive file system of claim 1, wherein one of the options optimizes the file system for large file random read operations, further comprising:
   means for determining an average block size of the large file; and
   means for reading-ahead blocks of data based on the determined average block size.

5. The adaptive file system of claim 1, wherein one of the options optimizes the file system for large file random write operations, further comprising means for writing data directly to the data storage device.

6. The adaptive file system of claim 5, further comprising:
   a buffer adapted to store a page to be overwritten by the large file random write operation; and
   means for disabling the buffer.

7. An adaptive file system for managing data stored on one or more data storage devices, comprising:
   means for characterizing the data on the data storage devices managed by the file system;
   means for tuning the file system, according to the data characterization, by selecting one or more options to configure a kernel during boot-up and an operating system during mount time, wherein one of the options optimizes the file system for small file random read/write operations; and
   means for performing a delayed read/write operation.

8. An adaptive file system for managing data stored on one or more data storage devices, comprising:
   means for characterizing the data on the data storage devices managed by the file system;
   means for tuning the file system, according to the data characterization, by selecting one or more options to configure a kernel during boot-up and an operating system during mount time, wherein one of the options optimizes the file system for accessing metadata;
   means for generating a search parameter; and
   means for performing a search in accordance with the search parameter.

9. The adaptive file system of claim 8, wherein the search parameter compares either left-most or right-most characters of a file name.

10. The adaptive file system of claim 1, wherein one of the options optimizes the file system for sequential read operations, further comprising:
    means for determining all files in a directory; and
    means for prefetching each file in the directory into a buffer.

11. A method for managing data stored on one or more data storage devices using an adaptive file system, comprising:
    characterizing the data on the data storage devices managed by the file system based on access or storage attributes of the data; and
    using the data characterization, tuning the file system by selecting one or more options to configure a kernel during boot-up and an operating system during mount time.

12. The method of claim 11, wherein one of the options optimizes the file system for sequential read/write operations, further comprising:
    disabling caching of the data; and
    performing read/write operations directly to the data storage device.

13. The method of claim 12, further comprising pre-allocating blocks of data.

14. The method of claim 11, wherein one of the options optimizes the file system for large file random read operations, further comprising:
    determining an average block size of the large file; and
    reading-ahead blocks of data based on the determined average block size.

15. The method of claim 11, wherein one of the options optimizes the file system for large file random write operations, further comprising writing data directly to the data storage device.

16. The method of claim 15, further comprising buffering a page to be overwritten by the large file random write operation.

17. A method for managing data stored on one or more data storage devices using an adaptive file system, comprising:
    characterizing the data on the data storage devices managed by the file system based on access or storage attributes of the data;
    using the data characterization, tuning the file system by selecting one or more options to configure a kernel during boot-up and an operating system during mount time, wherein one of the options optimizes the file system for small file random read/write operations; and
    performing a delayed read/write operation.

18. A method for managing data stored on one or more data storage devices using an adaptive file system, comprising:
    characterizing the data on the data storage devices managed by the file system based on access or storage attributes of the data;
    using the data characterization, tuning the file system by selecting one or more options to configure a kernel during boot-up and an operating system during mount time, wherein one of the options optimizes the file system for accessing metadata;

generating a search parameter; and performing a search in accordance with the search parameter.

19. The method of claim 18, wherein the search parameter compares either left-most or right-most characters of a file name.

20. The method of claim 11, wherein one of the options optimizes the file system for sequential read operations;

determining all files in a directory; and prefetching each file in the directory into a buffer.

21. A computer system, comprising:

an interconnect bus;

one or more processors coupled to the interconnect bus and adapted to be configured for server specific functionalities including network processing, file processing, storage processing and application processing;

a configuration processor coupled to the interconnect bus and to the processors, the configuration processor dynamically assigning processor functionalities upon request;

one or more data storage devices coupled to the processors and managed by a file system;

means for characterizing the data on the data storage devices managed by the file system based on access or storage attributes of the data; and means for tuning the file system according to the data characterization by selecting one or more options in an operating system kernel and a mount table.

* * * * *